United States Patent
Atarius

(10) Patent No.: US 6,278,699 B1
(45) Date of Patent: Aug. 21, 2001

(54) SYNCHRONIZATION TECHNIQUES AND SYSTEMS FOR SPREAD SPECTRUM RADIOCOMMUNICATION

(75) Inventor: Roozbeh Atarius, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/100,951

(22) Filed: Jun. 22, 1998

(51) Int. Cl.[7] ................................................. H04B 7/212
(52) U.S. Cl. ..................... 370/324; 370/507; 370/508; 370/509; 370/510; 370/512
(58) Field of Search ................................. 370/324, 507, 370/508, 509, 512

(56) References Cited

U.S. PATENT DOCUMENTS

| | | | |
|---|---|---|---|
| 4,984,247 | * | 1/1991 | Kaufmann et al. ................ 375/1 |
| 5,208,830 | * | 5/1993 | Cornec et al. ..................... 375/1 |
| 5,390,216 | | 2/1995 | Bilitza et al. ................... 375/106 |
| 5,544,155 | * | 8/1996 | Lucas et al. .................... 370/342 |
| 5,579,338 | * | 11/1996 | Kojuma ........................... 375/208 |
| 5,586,113 | * | 12/1996 | Adachi et al. .................. 370/342 |
| 5,910,964 | * | 6/1999 | Sujita ............................. 375/200 |
| 6,097,714 | * | 8/2000 | Nagatani et al. ................ 370/342 |

FOREIGN PATENT DOCUMENTS

| | | |
|---|---|---|
| 6-350586 | 12/1994 | (JP) . |
| 8-070288 | 12/1996 | (JP) . |
| 139703 A | * 5/1997 | (JP) .................. H40B/7/216 |
| WO91/10305 | 7/1991 | (WO) . |
| WO92/11706 | 7/1992 | (WO) . |
| WO98/58463 | 12/1998 | (WO) . |

* cited by examiner

Primary Examiner—Hassan Kizou
Assistant Examiner—Thien D. Tran
(74) Attorney, Agent, or Firm—Burns, Doane, Swecker & Mathis, L.L.P.

(57) ABSTRACT

A method and apparatus for synchronizing to a time structure associated with base station transmissions in a radiocommunication system are described. A broadcast control channel can contain synchronization symbols within one or more of a plurality of timeslots. The symbols can be provided as periodic, e.g., exponential, signals which introduce a frequency deviation into the broadcast control channel. This frequency deviation can be recognized by the receiver to synchronize to the time structure of the base station transmissions. Moreover, the variation in the frequency deviation caused by phase rotation associated with local oscillator inaccuracy can also be compensated to achieve frequency synchronization.

12 Claims, 4 Drawing Sheets

SYNCHRONIZATION TECHNIQUES AND SYSTEMS FOR SPREAD SPECTRUM RADIOCOMMUNICATION

BACKGROUND

The present invention relates to digital radio systems, and more specifically, to performing synchronization as part of the processing of a received signal in a spread spectrum radiocommunication system.

Radiocommunication systems involve the transmission of information over an air interface, for example by modulating a carrier frequency with that information. Upon reception, a receiver attempts to accurately extract the information from the received signal by performing an appropriate demodulation technique. However, in order to demodulate a received signal, it is first necessary to synchronize timing between the transmitter and the receiver. Different levels of synchronization may be required depending upon the design of the radiocommunication system. For example, in most systems clocking differences between the transmitter and the receiver create differences in timing at a bit level. Moreover, in some radiocommunication systems, information is transmitted in bursts, sometimes referred to as "frames", which represent chunks of information that are independently detected and decoded. In these types of systems it is also desirable to locate the beginning of a frame, so that information relevant to a particular receiver is isolated and demodulated. Likewise, some systems (e.g., time division multiple access or TDMA systems) further subdivide frames into timeslots to create channels that are time multiplexed with one another. In these systems it is further desirable to synchronize the receiver to the beginning of each timeslot.

Some systems provide channelization using a spread spectrum technique known as code division multiple access (CDMA). In CDMA systems, the information data stream to be transmitted is first coded or spread using a unique spreading code and then combined with a long PN-sequence or a shorter scrambling-sequence. In the latter case, the scrambling-sequences are planned from cell to cell so that neighboring cells use different scrambling-sequences or scrambling-masks. The information data stream and the PN-sequence or the scrambling sequence can have the same or different bit rates. The bits of the unique spreading code and long PN-sequence are usually referred to as chips. Thus, in CDMA systems, it is also desirable to synchronize the receiver to the chip boundaries, i.e., bit level synchronization.

To further understand the synchronization tasks associated with signal processing in a CDMA radiocommunication system, consider the following example. FIG. 1 illustrates the use of base stations to transmit radio waves to mobile users (mobile stations) in a cellular system. In a CDMA system, base station 10 can transmit signals to mobile stations 14 and 15 as a single (composite) signal. The signal directed to mobile station 14 is typically coded with a short code that is orthogonal or mostly orthogonal to a short code that is used to code the signal directed to mobile station 15. These signals are then spread with a second code that is sometimes referred to as a long code, associated with base station 10. The sum of the two coded and spread signals is then transmitted by base station 10.

When mobile station 14 receives the composite signal, mobile station 14 multiplies the spread signal with the long code and the short code to recreate the signal directed to mobile station 14 and the signal directed to mobile station 15 is suppressed as interference noise. Similarly, mobile station 15 multiplies the spread signal with the long code and the short code assigned to mobile station 15 to recreate the signal directed to mobile station 15 and the signal directed to mobile station 14 is suppressed as interference noise. The receivers associated with mobile stations 14 and 15 must have acquired the various levels of synchronization to the received signal which were described above, in addition to learning or knowing the applicable long and short codes, in order to implement despreading, demodulation and decoding of the information residing in that signal.

Many different techniques have been developed in order to acquire synchronization at each of the various levels. For timeslot synchronization these techniques typically depend, in large degree, on the frame structure and the manner in which overhead or control information is conveyed to the mobile station. Overhead information is usually provided on one or more broadcast control channels which are transmitted by base stations using known channels to which mobile stations can quickly lock onto and receive the overhead information including, among other things, information used to acquire frame synchronization with that base station. Those skilled in the art will appreciate that many radiocommunication systems have unsynchronized base stations, i.e., base stations which do not share a common timing reference signal. Accordingly, timeslot synchronization is a process which needs to be performed both at start-up and as a mobile station moves from cell to cell.

In one proposed wideband CDMA system, timeslot synchronization is performed by searching for a synchronization field which is broadcast as part of a control channel at a predetermined position (time) relative to a beginning of a frame or timeslot. The synchronization field is a so-called Gold code, which has good correlation properties to enhance detection at the mobile station. Upon detecting the received Gold code, the mobile station will then know the timeslot boundary, enabling it to read other fields and continue, for example, to perform frame and bit synchronization so that it can read information that is transmitted to it by the system.

A matched filter can be used to detect the Gold code at the mobile station during this part of the synchronization process to perform a correlation with the received signal and look for peaks in the correlation. To accomplish this task, the matched filter would need to have a length equal to the length of the synchronization field. Since this particular application employs wideband CDMA techniques, the Gold code is spread to the chip rate, e.g., 256 chips, by multiplying it with a spreading code associated with the broadcast control channel.

Due to inaccuracy associated with the mobile station's local oscillator, the phase of the synchronization symbol changes from the beginning of the symbol to the end of the symbol. This rotation in phase results in a severe signal energy loss at the peaks of the matched filter output which, in turn, may result in correlation peaks being misdetected. For example, assuming an oscillator having an inaccuracy of 10 ppm, the phase rotation experienced during a synchronization symbol (Gold code) is 450 degrees as calculated by:

Phase Rotation=360°×Oscillator Inaccuracy×Carrier Frequency/ Symbol Rate where the carrier frequency and symbol rate are assumed to be 2 Ghz and 16 kHz, respectively, for this example. To avoid the signal energy loss associated with this magnitude of phase rotation, it is possible to segment the matched filter into a number of filter segments. This reduces the signal energy loss, but creates a reduction in the signal-to-noise ratio of the received signal. Thus, it would be preferable to find some other technique for performing primary (timeslot) synchronization to a broadcast control channel of a radiocommunication system which avoids the need for a matched filter.

SUMMARY

The present invention relates to time (and frequency) synchronization of digital radio signals by identifying a synchronization field transmitted on a broadcast control channel. According to exemplary embodiments of the present invention, the synchronization field is a periodic non-spread (unmodulated) signal, e.g., an exponential signal, which introduces a known frequency deviation into the carrier frequency of the broadcast control channel. A mobile station can then read the broadcast control channel containing this synchronization field to look for the exponential signal and identifying its frequency deviation. The time at which the frequency deviation begins can be used to provide time synchronization to the control channel, while the magnitude of the frequency deviation can be used to perform frequency synchronization. This avoids the need for the segmented matched filter and its accompanying lower signal-to-noise ratio.

Exemplary embodiments of the present invention apply this time/frequency synchronization technique in a wideband CDMA system wherein two broadcast control channels are provided to provide mobile stations with information needed to access the system, e.g., timeslot sync, frame sync, chip sync and the long code of the base station to which they are listening. According to one exemplary embodiment, each broadcast control channel includes a synchronization field containing a code having good correlation properties, e.g., a Gold code. One of the two broadcast control channels also includes a periodic signal, e.g., an exponential signal, which introduces the aforedescribed frequency deviation. This latter broadcast control channel can be locked onto by a mobile station to acquire timeslot and frame synchronization. Then, the Gold codes from both broadcast control channels can be evaluated to determine the long code associated with the base station which is broadcasting the two control channels. According to alternative embodiments, the periodic signal may replace one or both of the Gold codes.

BRIEF DESCRIPTION OF THE DRAWINGS

The present invention will now be described with reference to the accompanying drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are described as using a hybrid TDMA/CDMA methodology, in which communication between the base station and the mobile terminals is performed using spreading codes, but wherein information is also conveyed in discrete time slots. However, those skilled in the art will appreciate that the concepts disclosed herein find use in other methodologies, including, but not limited to, frequency division multiple access (FDMA), TDMA, CDMA or any other access methodology. Likewise, some of the exemplary embodiments provide illustrative examples relating to an exemplary frame and logical channel structure which is under consideration for certain third generation radiocommunication systems, however, the techniques described herein are equally applicable to radio base stations in any system.

When the first frame of a desired information signal is received by a receiver, in most communication systems, the clock at the transmitter and the clock at the receiver are not "locked", i.e. they are not synchronized in time to the frame and logical channel format used for transmission of information from a base station. For the purposes of illustration, and not limitation, consider the exemplary frame and logical channel format depicted in FIG. 2. Therein sixty-four radio frames of 10 ms each make up a superframe. Each radio frame is further subdivided into sixteen timeslots. Each time slot includes various types and fields of information, depending upon the physical and/or logical channel to which it corresponds. The physical channels may include traffic channels and control channels.

Figure 1:
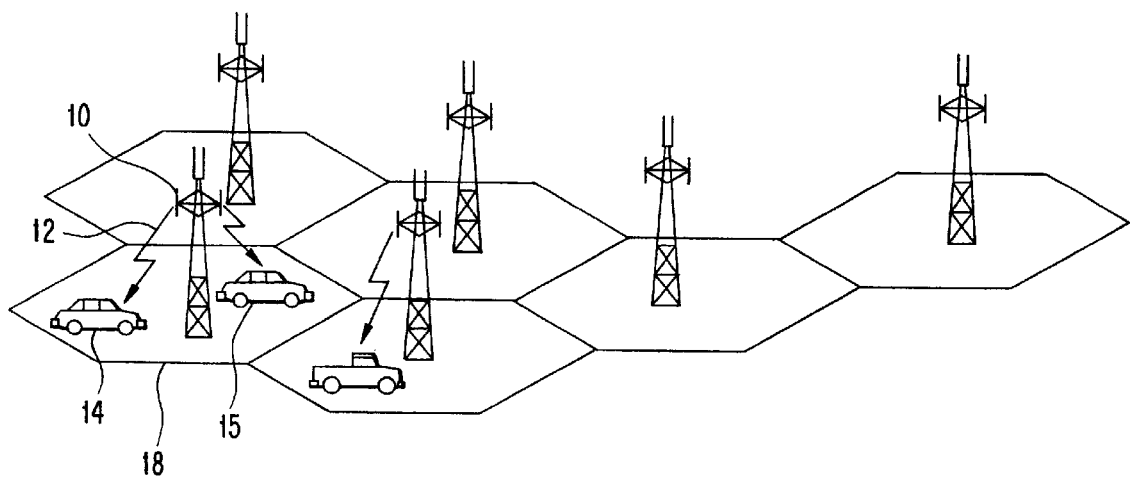
FIG. 1 illustrates a conventional cellular radiocommunication system in which the present invention can be implemented.
Figure 2:
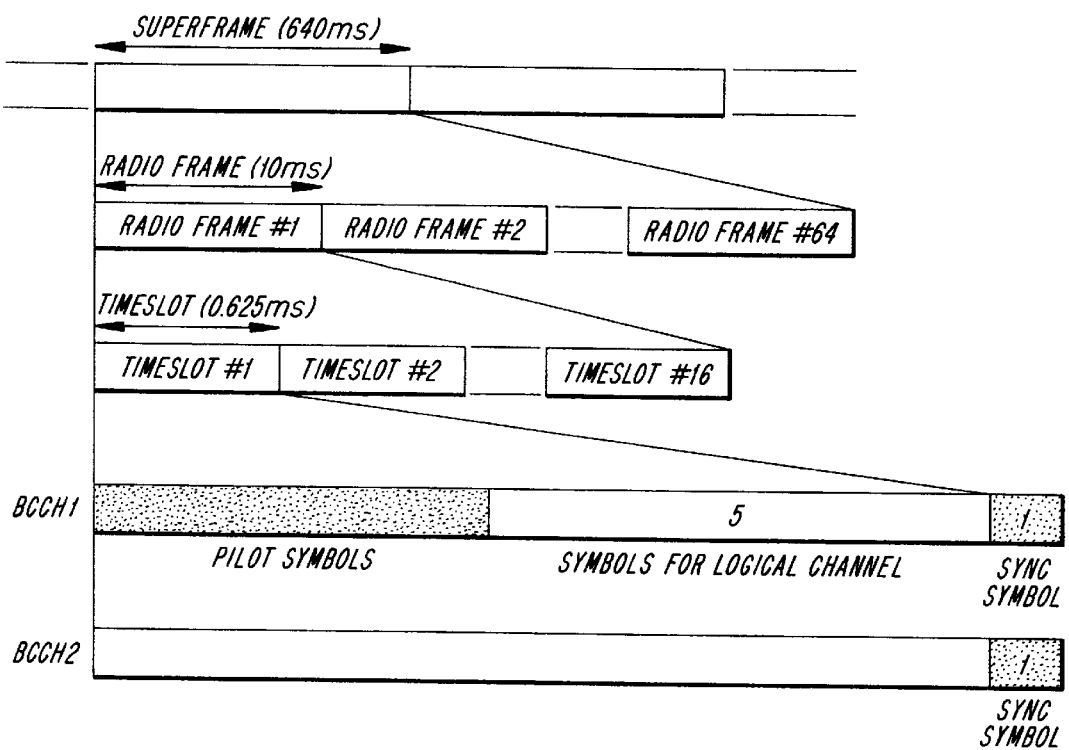
FIG. 2 depicts a known physical and logical channel structure.

In FIG. 2, one timeslot from each of two control channels, referred to herein as BCCH1 and BCCH2, are depicted. These two control channels are broadcast by the base station to all of the mobile stations in the area serviced by that base station. Each timeslot broadcast on BCCH1 includes 4 pilot symbols, 5 symbols associated with a logical sub-channel carried by BCCH1, i.e., to convey information regarding network activity to listening mobile stations, and one synchronization symbol, sometimes referred to in this exemplary embodiment as a long code masked symbol (LCMS). BCCH2 carries only the synchronization symbol. Earlier, it has been proposed that the synchronization symbol transmitted on BCCH1 be used for a mobile station to acquire timeslot synchronization, while the synchronization symbol transmitted on BCCH2 be used for a mobile to acquire frame synchronization. Comparison of the bit pattern associated with each synchronization pattern provides information to the mobile station regarding the long code employed by the base station which is broadcasting on these two channels.

Figure 3:
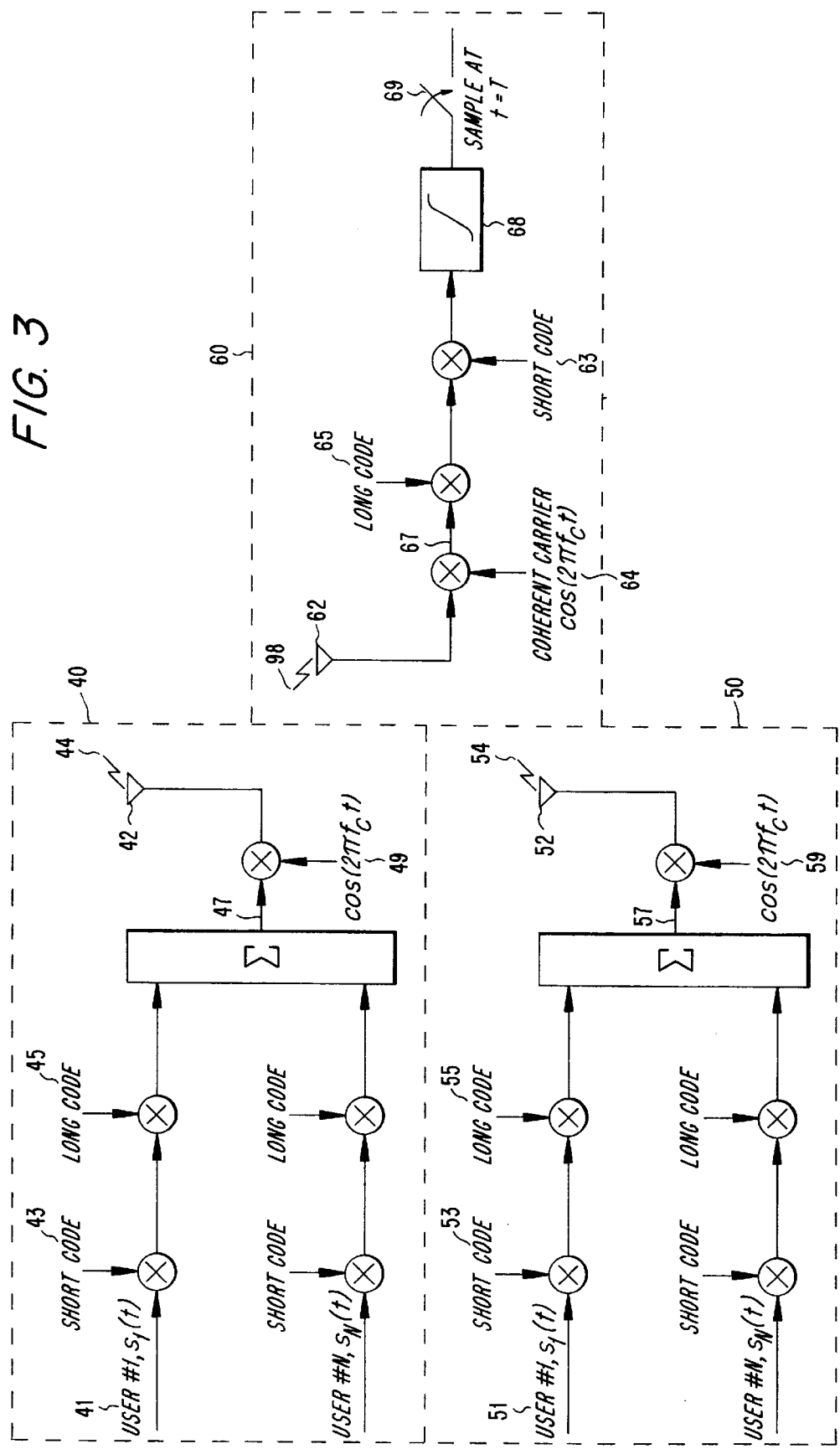
FIG. 3 is an exemplary transmitter and receiver structure which can be used to implement the present invention.

Prior to describing Applicant's novel synchronization techniques, a brief description of some of the transmission and reception components which can be used to communicate information over the air interface using the frame and logical channel structure illustrated in FIG. 2 or those described below will now be provided with respect to FIG. 3. Therein, two sources 40 and 50, e.g,. supported by different transmitters in a single base station, transmit different signals over the same frequency spectrum using spread spectrum techniques. The input data associated with each source are multiplied by an orthogonal short code and spread by an additional long code. The sum of the coded and spread user data is then transmitted using a radio frequency carrier and a transmitting antenna. For example, in FIG. 3, user input data 41 is multiplied by an orthogonal short code 43 and spread using a long code 45. The sum of the coded and spread user data 47 is used to modulate a radio frequency carrier 49 which is transmitted by transmitting antenna 42. Similarly, user input data 51 is multiplied by an orthogonal short code 53 and spread using a long code 55. The sum of the coded and spread user data 57 is used to modulate a radio frequency carrier 59 which is transmitted by transmitting antenna 52. Transmitting antenna 42 transmits signal 44 and transmitting antenna 52 transmits signal 54.

Receiver 60 has a receiving antenna 62. Signals 44 and 54 experience channel effects by virtue of having been transmitted over an air interface, e.g., reflections of signals 44 and 54 that travel along different paths of varying lengths. The interactions between these reflections cause multipath fading whose effects will vary depending upon the specific location of the mobile station at any given time, and the strengths of these signals decrease as the distance between the source and the receiver increases. Receiver 60 can use any one of a plurality of known RAKE receivers (which are well known to those skilled in the art)to collect the signal energy from different signal paths. When receiver 60 receives signal 98, receiver 60 demodulates the signal using carrier signal 64 to provide composite signal 67. Composite signal 67 is despread using synchronized long code 65 and decoded using synchronized orthogonal code 63. Receiver 60 can use an integrator 67 and a sampler 69 to recreate the transmitted signal.

In order to accomplish these signal processing tasks for receiving data over a traffic channel, receiver 60 must first know the appropriate long and short codes to use for despreading. This information can be obtained from one or more control channels, e.g., BCCH1 or BCCH2, to which the mobile station must first synchronize in order to read this information. As mentioned above, earlier proposals centered on acquiring timeslot synchronization using the synchronization word transmitted on BCCH1, frame synchronization using the synchronization word transmitted on BCCH2 and the long code identity by comparing the patterns of the two sync words. However, exemplary embodiments of the present invention avoid the need to use the matched filter described above by sending a periodic signal on one or both of the broadcast control channels and, in the mobile station, detecting the periodic signal to perform both time and frequency synchronization.

Figure 4:
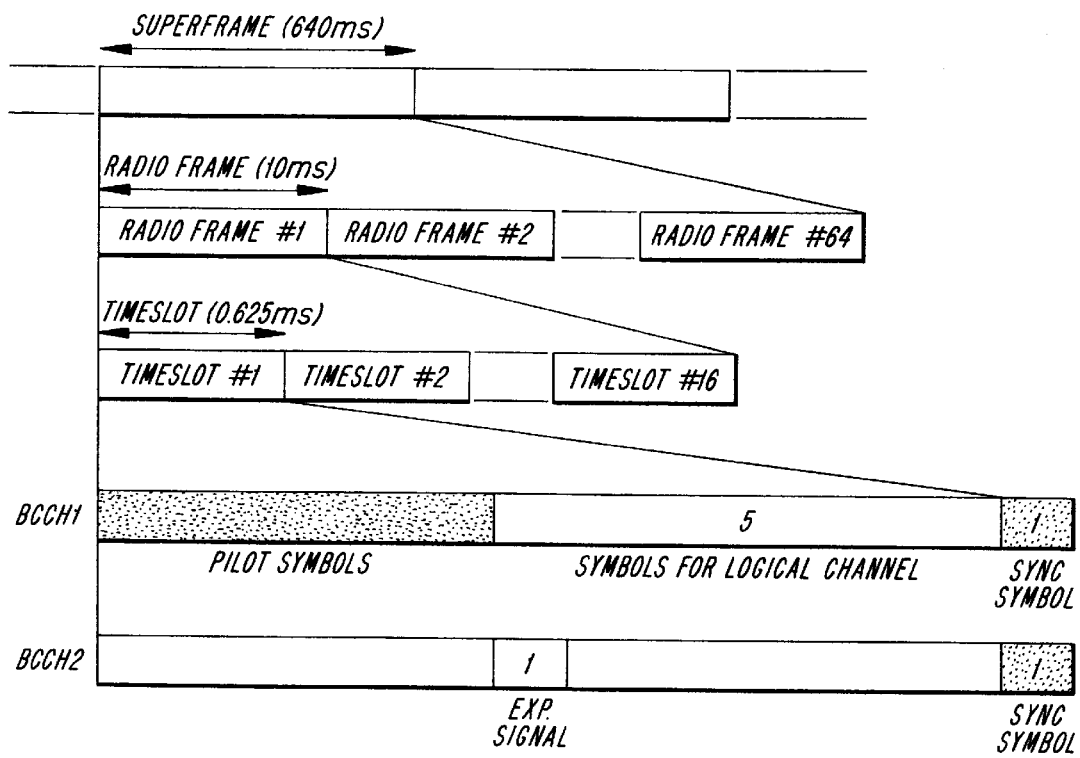
FIG. 4 is depicts a physical and logical channel structure according to an exemplary embodiment of the present invention wherein an exponential function is provided as a synchronization symbol.

Merely as an example of a technique for introducing a frequency deviation, consider an exemplary embodiment of the present invention wherein an exponential signal is inserted into the second broadcast control channel BCCH2 as illustrated in FIG. 4. Therein, the carrier frequency of BCCH2 is modulated by an exponential signal for a duration of one symbol period at some point upstream in time from the synchronization symbol. The exponential signal itself, however, is unmodulated. Those skilled in the art will appreciate that many aspects of FIG. 4 are merely exemplary. For example, the exponential signal could occupy more than one symbol duration, e.g, be 2, 3, or 4 symbol periods. Moreover, the exponential signal could be placed after the synchronization symbol in the timeslot.

FIG. 4 depicts only timeslot #1 for BCCH2. The exponential signal could be transmitted only once per frame. Alternatively, the exponential could be transmitted in every timeslot or some subset of timeslots (e.g., every other timeslot) per frame. If the synchronization symbol is transmitted as an exponential signal in only one or a few timeslots per frame, then it may be desirable to increase the amplitude (power) of this signal so that it is more readily detected at the mobile station to speed up the synchronization process.

By transmitting modulating an exponential signal onto the carrier, as opposed to a Gold code, a frequency deviation is introduced. Consider that an exponential signal can be characterized as $\exp(j2\pi Ft)$ where F and t represent frequency and time, respectively. Use of an exponential signal transforms the phase rotation which is induced by the oscillator inaccuracy into an additive frequency deviation $\Delta F$. Thus, the phase rotated synchronization symbol of FIG. 4 can be represented as $\exp(j2\pi(F+\Delta F) t)$.

Although the frequency of the received signal has been modified, the synchronization symbol can still be detected by initially assuming $\Delta F=0$. In particular, the synchronization symbol can be detected by searching for, in the receiver, the frequency deviation F which was intentionally introduced by modulating the carrier with the exponential signal. For example, the exponential signal might have a time discrete frequency $f=\frac{1}{4}$, which could then searched for when reading the broadcast control channel BCCH2.

Various known techniques can be used to search for this frequency deviation, e.g., evaluating the phase of the incoming signal using, for example, linear regression techniques. Since the details associated with how the frequency deviation is recognized based on the specific frequency detection techniques used are not per se important to the present invention, they are omitted here to avoid obscuring this invention. However, the interested reader is referred to U.S. patent application Ser. No. 08/971,666, entitled "Method and Apparatus for Estimating a Frequency Offset", filed on Nov. 17, 1997 and U.S. patent application Ser. No. 09/026,724, entitled "Method and Apparatus for Detecting a Frequency Synchronization Signal", filed on Feb. 20, 1998, the disclosures of both of which are expressly incorporated here by reference.

By finding the time at which the frequency deviation begins, the receiver or mobile station will then be able to determine the beginning of the timeslot and/or frame boundary. Using this information the mobile station will then be time synchronized to the system and may also compare the patterns of the synchronization symbols (as done above with respect to the earlier proposed structure of FIG. 2) to determine the long code of the base station which is transmitting BCCH1 and BCCH2.

Additionally, since the magnitude of the frequency deviation which is intended is known based on the type of exponential (or other periodic) signal which is introduced as the synchronization symbol, $\Delta F$ can also be determined at the same time by comparing the intended frequency deviation F with the measured frequency deviation determined by the mobile station. In this way, the mobile station can compensate for frequency error associated with its local oscillator to perform frequency synchronization as well as time synchronization.

Although the foregoing exemplary embodiment depicts the exponential signal as being provided in addition to the earlier proposed synchronization symbols (e.g., Gold codes), those skilled in the art will appreciate that the exponential signal could also replace one or both of the synchronization symbols transmitted on BCCH1 and BCCR2 in the foregoing example.

Figure 5A:
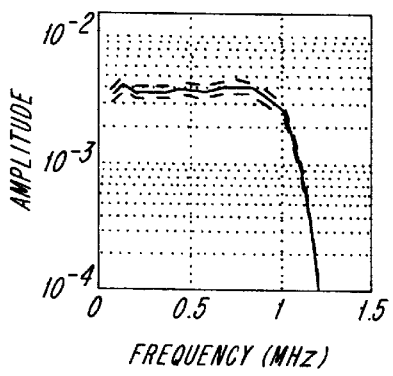
FIGS. 5(a)–5(c) are graphs of frequency versus amplitude for (a) a Gold code transmitted as a synchronization symbol, (b) an exponential symbol transmitted as a synchronization symbol and (c) a Σ-Δmodulated exponential symbol transmitted as a synchronization symbol.
Figure 5B:
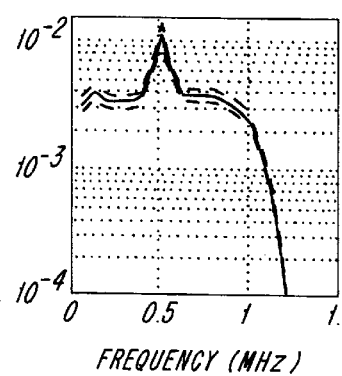
Figure 5C:
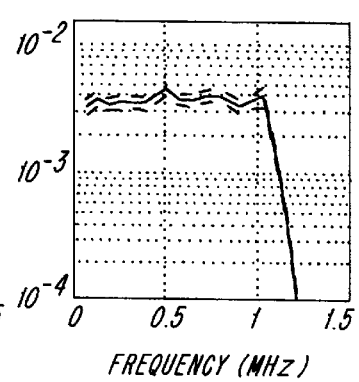

Additionally, the unmodulated exponential signal has a relatively narrow bandwidth as compared with the spread version of the Gold code which was previously suggested as a synchronization symbol. If it is desired to increase the bandwidth associated with the exponential signal, this signal can, for example, be spread using the well known Σ-Δ modulation technique. The effects of this modulation can be seen in the graphs of FIGS. 5(a)–5(c) wherein the relatively large spike associated with the unmodulated exponential signal of FIG. 5(b) is spread out over a greater bandwidth by Σ-Δ modulation in FIG. 5(c). It will be recognized by those skilled in the art that one advantage of Σ-Δ modulation is that the frequency of the periodic signal may still be estimated even after Σ-Δ modulation is applied.

The present invention has been described by way of exemplary embodiments to which the invention is not limited. Modifications and changes will occur to those skilled in the art without departing from the spirit and scope of the invention as defined in the appended claims.

What is claimed is:

1. A method for synchronizing to a time structure associated with information transmitted by a radiocommunication system comprising the steps of:

transmitting, on a broadcast control channel, a non-spread periodic signal;

detecting, at a mobile station, a frequency deviation of said periodic signal; and identifying a beginning of said time structure based on said detected frequency deviation.

2. The method of claim 1, further comprising the step of:

transmitting said information using time division multiple access techniques.

3. The method of claim 1, further comprising the step of:

transmitting said information using code division multiple access techniques.

4. The method of claim 1, wherein said time structure includes a plurality of timeslots associated with each frame, and wherein each timeslot includes a synchronization symbol created by transmission of said periodic signal.

5. The method of claim 1, wherein said time structure includes a plurality of timeslots associated with each frame, and wherein only one of said timeslots includes a synchronization symbol created by transmission of said periodic signal.

6. The method of claim 1, further comprising the step of:

increasing a frequency bandwidth of said periodic signal.

7. The method of claim 6, wherein said step of increasing a frequency and width further comprises the step of:

Σ-Δ modulating said periodic signal prior to transmission.

8. The method of claim 1, wherein said step of transmitting further comprises the step of:

transmitting a second synchronization symbol on said broadcast control channel.

9. The method of claim 8, wherein said second synchronization symbol is a Gold code.

10. The method of claim 1, further comprising the step of:

synchronizing to said broadcast control channel in frequency using said detected frequency deviation and knowledge of said periodic signal.

11. The method of claim 1, wherein said periodic signal is an exponential signal.

12. A mobile station comprising:

a receiver for a periodic signal transmitted on a broadcast control channel as, a synchronization symbol; and means for determining a time at which a frequency deviation of said periodic signal is introduced into said broadcast control channel to time synchronize said mobile station thereto.

* * * * *